US005941360A

United States Patent [19]

Putney et al.

[11] Patent Number: 5,941,360

[45] Date of Patent: *Aug. 24, 1999

[54] IMPULSE WRENCH WITH WRAP SPRING CLUTCH ASSEMBLY

[75] Inventors: Gordon A. Putney, Lake Geneva; Dean J. Iwinski, Muskego, both of Wis.

[73] Assignee: Snap-on Technologies, Inc., Lincolnshire, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,702

[22] Filed: Nov. 21, 1996

[51] Int. Cl.[6] .......................... B25B 23/157; F16D 43/20

[52] U.S. Cl. .......................................... 192/150; 173/178

[58] Field of Search .................................. 173/124, 178, 173/146, 213, 92; 192/37, 56.2, 150

[56] References Cited

U.S. PATENT DOCUMENTS

| | | | |
|---|---|---|---|
| 1,954,620 | 4/1934 | Connell | 192/56.2 |
| 2,100,552 | 11/1937 | Ripsch et al. | 192/56.2 |
| 2,111,280 | 3/1938 | Connell | 173/178 X |
| 3,476,418 | 11/1969 | Noerr, Jr. . | |
| 3,478,829 | 11/1969 | Bixby . | |
| 3,955,662 | 5/1976 | Thackston . | |
| 3,956,905 | 5/1976 | Thackston . | |
| 4,078,618 | 3/1978 | DePagter et al. | 192/150 X |
| 4,243,129 | 1/1981 | Schoeps . | |
| 4,328,871 | 5/1982 | Gluskin . | |
| 4,610,339 | 9/1986 | Ciolli . | |
| 4,760,903 | 8/1988 | Stegelmeier et al. . | |
| 4,875,528 | 10/1989 | Thackston | 173/178 |
| 4,892,175 | 1/1990 | Van Erden et al. . | |
| 4,920,836 | 5/1990 | Sugimoto et al. . | |
| 4,977,788 | 12/1990 | Besemann . | |
| 4,984,666 | 1/1991 | Orii et al. . | |
| 5,135,086 | 8/1992 | Ciolli . | |
| 5,139,093 | 8/1992 | Lyon et al. . | |
| 5,191,946 | 3/1993 | Lyon et al. . | |
| 5,305,835 | 4/1994 | Campbell et al. . | |
| 5,318,161 | 6/1994 | Lyga . | |
| 5,325,950 | 7/1994 | Kimberlin . | |
| 5,350,025 | 9/1994 | Campbell et al. . | |
| 5,399,129 | 3/1995 | Ciolli . | |
| 5,437,205 | 8/1995 | Tseng . | |
| 5,460,252 | 10/1995 | Kosugi et al. . | |
| 5,673,758 | 10/1997 | Sasaki et al. . | |

*Primary Examiner*—Rodney H. Bonck
*Attorney, Agent, or Firm*—Emrich & Dithmar

[57] ABSTRACT

A rotary impulse tool has a motor-driven drive shaft and an output shaft. The drive shaft is threadedly coupled to a flywheel sleeve, which is spring-biased forwardly and is splined to a rotatable race structure of a wrap spring clutch assembly, which includes a wrap spring disposed in clearance fit coaxially between cylindrical surfaces of the race structure, the wrap spring having a front end fixed to the output shaft and a rear end coupled to a first conical control member. A second conical control member is axially movable between engaged and disengaged positions relative to the first control member for, respectively, shifting the clutch assembly to an engaged condition for transmitting torque between the drive and output shafts and a disengaged condition for decoupling those shafts. When the clutch assembly is engaged, the drive shaft rotates the output shaft and, as torque builds up on the output shaft, it slows to develop a speed differential between the drive and output shafts, which retracts the flywheel sleeve rearwardly against a compression spring to engage the second control member and move it axially to its disengaged position for disengaging the clutch assembly, whereupon the flywheel sleeve rapidly rotatably and axially returns forwardly, engaging the second control member to move it back to its engaged position and reengage the clutch assembly to transmit the kinetic energy of the flywheel sleeve in an impulse to the output shaft.

18 Claims, 3 Drawing Sheets

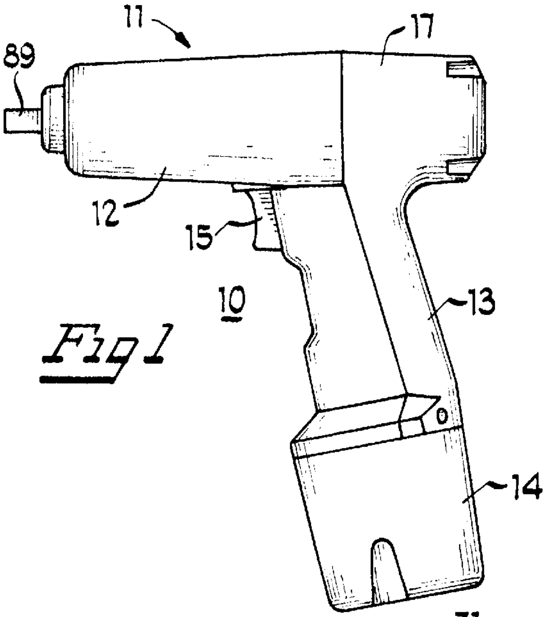
Fig 1
Fig 5
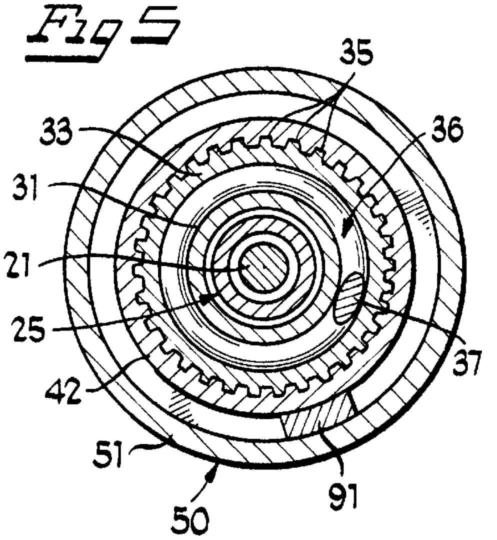
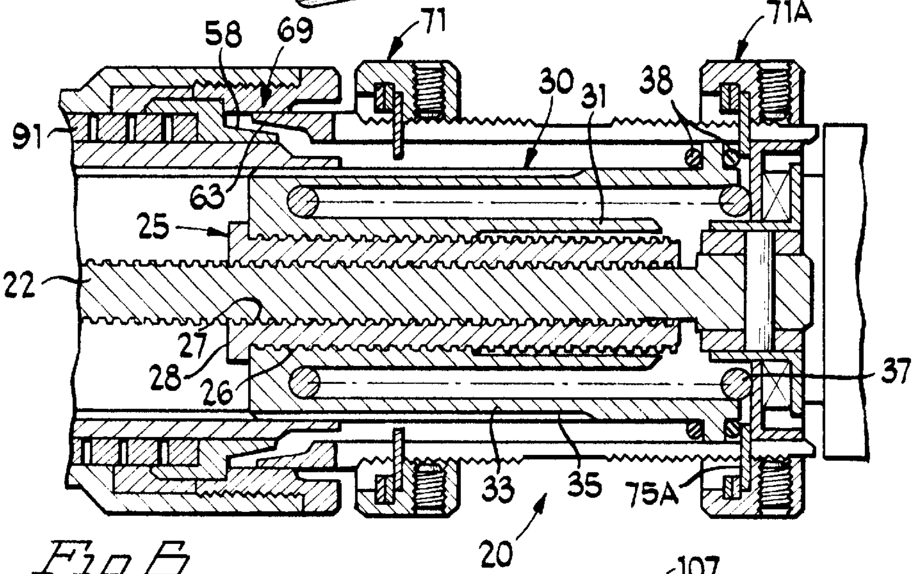
Fig 6
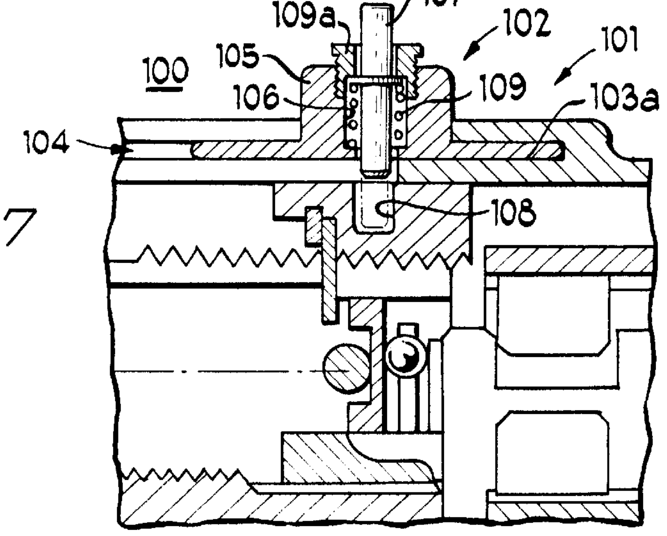
Fig 7

IMPULSE WRENCH WITH WRAP SPRING CLUTCH ASSEMBLY

BACKGROUND OF THE INVENTION

1. Field the Invention

The present invention relates to power tools and, in particular, to power tools of the impact or impulse type.

2. Description of the Prior Art

Power-driven impulse tools, such as impact wrenches, are commonly provided with a clutch mechanism which will operate to deliver torque from a motor-driven input shaft to an output shaft coupled to an associated load, such as a fastener. At low torque, such as when a nut is initially being run down on a stud, the torque is delivered continuously at high speed, but at higher torque levels the torque is delivered intermittently in a series of impulses or impacts.

More specifically, the clutch mechanism typically includes a hammer connected to the drive shaft and an anvil connected to the output shaft, with inter-engaging parts, such as fingers. The hammer is spring-biased axially into engagement with the anvil. When the torque, or resistance of the driven member, reaches a predetermined level the output shaft slows down but the input shaft continues to rotate substantially at the motor speed. The hammer is coupled to the drive shaft by a suitable screw-like camming mechanism, so that the speed differential of the drive and output shafts causes the hammer to retract axially against the bias spring until the clutch fingers on the hammer and anvil disengage. When the clutch is disengaged, the hammer will rotate freely With the drive shaft past the previously-engaged fingers on the anvil and the bias spring will simultaneously urge the hammer axially back into engagement with the next finger on the anvil to create a torquing impact of the hammer against the anvil, after which the hammer will again retract as torque builds up. Thus, torque is delivered in a repeated hammering action.

These prior types of impact tools have a number of disadvantages. First of all, the repeated hammering action is very noisy and generates considerable reaction forces resulting in severe vibration of the tool. The device affords relatively inconsistent torquing, the torque varying with fastener joint mass and stiffness. Also, the mechanism does not afford easy and precise control of the limiting torque.

SUMMARY OF THE INVENTION

It is a general object of the invention to provide an improved impulse tool which avoids the disadvantages of prior such tools while affording additional structural and operating advantages.

An important feature of the invention is the provision of a rotary impulse tool which is characterized by a relatively quiet operation.

A further feature of the invention is the provision of an impulse tool of the type set forth which delivers torque relatively smoothly with minimal vibration.

Another feature of the invention is the provision of an impulse tool of the type set forth, which permits simple and accurate control of limiting torque.

Yet another feature of the invention is the provision of a tool of the type set forth which permits easy control of the repetition frequency of the impulses and the amount of torque delivered with each impulse.

Still another feature of the invention is the provision of an improved bidirectional wrap spring clutch assembly for delivering torque from an input shaft to an output shaft.

A still further feature of the invention is the provision of a rotary impulse tool which utilizes a flywheel mechanism for delivering torque impulses.

Certain ones of these and other features of the invention are attained by providing a rotary impulse tool for delivering torque impulses to a load comprising: a drive shaft having an axis and adapted to be coupled to a motive source, an output shaft adapted to be coupled to the load, an energy storage mechanism coupled to the drive shaft and axially and rotatably movable relative thereto between first and second conditions, a clutch assembly coupled between the energy storage mechanism and the output shaft and having an engaged condition for transmitting torque and a disengaged condition, the energy storage mechanism being responsive to a rotational speed differential between the drive shaft and the output shaft when the clutch assembly is in its engaged condition for moving from the first condition to the second condition to store potential energy, and control mechanism coupled to the clutch assembly and responsive to movement of the energy storage mechanism to its second condition for shifting the clutch assembly to its disengaged condition, the energy storage mechanism in its second condition being responsive to shifting of the clutch assembly to its disengaged condition for rapidly rotatably and axially moving to its first condition to convert the stored potential energy to kinetic energy, the control mechanism being responsive to movement of the energy storage mechanism to its first condition to shift the clutch assembly to its engaged condition for delivering the kinetic energy of the energy storage mechanism in a torque impulse to the output shaft.

Further features of the invention are attained by providing a rotary impulse tool of the type just described, which includes an adjustment mechanism movable for determining the position of the energy storage mechanism in its first and second conditions and thereby determining the amount of energy stored therein and an actuator mechanism for selectively controlling movement of the adjustment mechanism.

Still further features of the invention are attained by providing a bidirectional wrap spring clutch assembly comprising: rotatable drive structure, rotatable driven structure, a helical wrap spring coupled between the drive structure and the driven structure and operable in an engaged condition for connecting the drive structure to the driven structure by means of frictional surface contact and a disengaged condition for decoupling the drive structure from the driven structure, at least one of the drive structure and the driven structure including coaxial cylindrical surfaces receiving the wrap spring in clearance fit coaxially therebetween, and control mechanism engageable with the wrap spring for shifting the wrap spring between its engaged and disengaged conditions, whereby the wrap spring in its engaged condition frictionally grips one of the cylindrical surfaces when the input structure is rotating in one direction and frictionally grips the other of the cylindrical surfaces when the drive structure is rotating in the opposite direction.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of power tool incorporating a rotary impulse mechanism in accordance with the present invention;

FIG. 5 is a view in vertical section taken along the line 5—5 in FIG. 3;

FIG. 6 is a fragmentary view of a portion of FIG. 4 for a second rotational direction; and FIG. 7 is a fragmentary sectional view of an alternative adjustment mechanism for the impulse mechanism of FIGS. 2–6.

DESCRIPTION OF THE PREFERRED EMBODIMENTS

Figure 2:
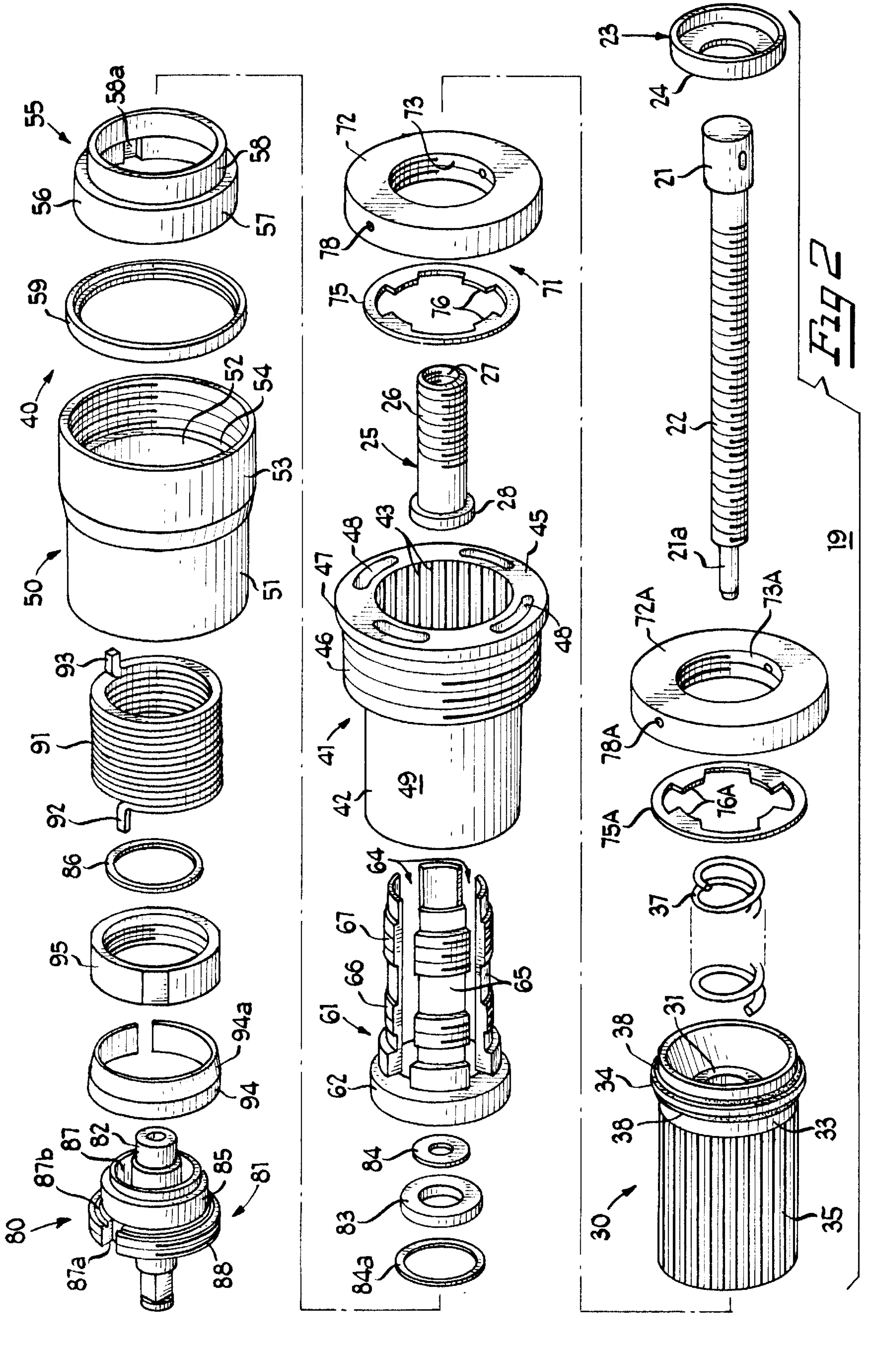
FIG. 2 is an exploded perspective view of the impulse mechanism of the power tool of FIG. 1.

Referring to FIG. 1, there is illustrated an impulse tool, generally designated by the numeral 10, in accordance with the present invention. The tool 10 has a housing 11 including an elongated barrel portion 12 and a handle portion 13 depending from the barrel portion 12 intermediate its ends. The handle portion 13 carries a battery pack 14 at its distal end and an operating trigger 15 adjacent to the barrel portion 12, all in a known manner. A motor assembly 17 (see FIGS. 3 and 4) is disposed in the rear end of the barrel portion 12 and has an output shaft 18 for driving an impulse mechanism 19, constructed in accordance with the present invention and disposed in the forward end of the barrel portion 12. While a battery-powered motor assembly 17 is illustrated, it will be appreciated that the motor assembly 17 could also be powered from an AC source with a suitable AC-DC adapter. Alternatively, the impulse tool 10 could be provided with a fluid-driven motor assembly in a known manner.

Referring now to FIGS. 2–5, the impulse mechanism 19 includes a drive structure 20 which is coupled to the motor output shaft 18, a driven structure 80 which is adapted to be coupled to an associated load, such as a fastener or the like, and a wrap spring clutch assembly 90 coupled between the drive structure 20 and the driven structure 80. The drive structure 20 includes an elongated drive shaft 21, the rear end of which is coupled by suitable means to the output shaft 18 of the motor assembly 17, and the forward end of which defines a reduced-diameter tip 21*a*. The drive shaft 21 has an external thread 22 formed thereon along most of its length. Disposed about the rear end of the drive shaft 21 is a cylindrical thrust washer/pilot ring 23, which is generally cup-shaped in transverse cross section defining a radially extending annular flange 24. The drive structure 20 also includes a direction sleeve 25, which is in the nature of a tubular member having an external thread 26 along most of its length, and an internal thread 27 along its entire length designed for threaded engagement with the drive shaft 21. The sleeve 25 is provided at its forward end with a radially outwardly extending annular flange 28.

The drive structure 20 also includes a cylindrical spring sleeve 30, which cooperates with the direction sleeve 25 to form a flywheel, as will be explained more fully below. The spring sleeve 30 includes an elongated central tube 31 unitary at its forward end with a radially outwardly extending annular end wall 32 which, is in turn, unitary with a rearwardly extending outer tube 33, the rearward end of which extends rearwardly slightly beyond the rearward end of the central tube 31. Unitary with the outer tube 33 adjacent to the rearward end thereof is a radially outwardly extending annular flange 34. Formed in the outer surface of the outer tube 33 are a plurality of longitudinally extending and circumferentially spaced-apart splines 35. The central and outer tubes 31 and 33 cooperate to define therebetween a pocket 36 for receiving one end of a helical compression spring 37, which seats against the end wall 32. The rear end of the spring 37 is seated against the flange 24 of the thrust washer/pilot ring 23 so that the spring 37 resiliently urges the spring sleeve 30 axially forwardly. O-rings 38 are disposed circumferentially about the rear end of the outer tube 33, respectively on the opposite sides of the flange 34. The direction sleeve 25, the spring sleeve 30 and the compression spring 37 cooperate to define an energy storage mechanism 39, as will be explained more fully below.

Figures 3, 4:
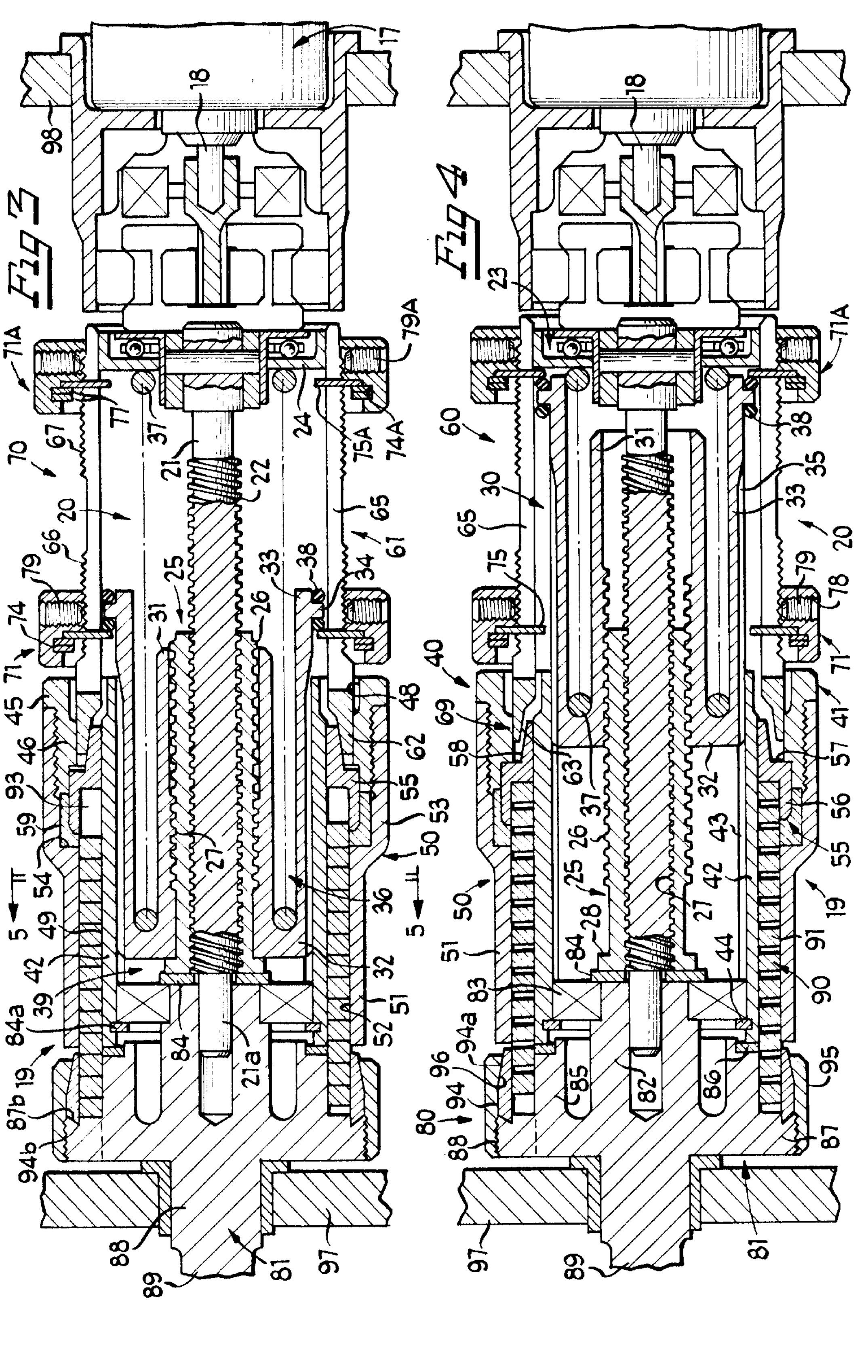
FIG. 3 is an enlarged, fragmentary view in vertical section of the assembled impulse mechanism of FIG. 2, with the wrap spring clutch assembly in its normal engaged condition.
FIG. 4 is a view similar to FIG. 3, with the wrap spring clutch assembly illustrated in its disengaged condition in a first rotational direction.

The drive structure 20 also includes a rotatable race structure 40, including an inner race 41 and an outer race 50 which are connected together to form an input member for the wrap spring clutch assembly 90. The inner race 41 includes a cylindrical tube 42 dimensioned to receive coaxially therein the spring sleeve 30, the tube 42 having formed on its inner surface splines 43 designed for splined engagement with the splines 35 of the spring sleeve 30. Also formed in the inner surface of the tube 42 adjacent to its forward end is a circumferential groove 44 (FIG. 4) for a purpose to be described below. Unitary with the tube 42 at its rearward end extending radially outwardly therefrom is an annular end wall 45. Unitary with the end wall 45 and projecting forwardly therefrom is a short, cylindrical, outer sleeve 46 which is spaced radially outwardly from the tube 42. The outer surface of the outer sleeve 46 is externally threaded and has an outer diameter slightly less than that of the end wall 45 for cooperation therewith to define an annular shoulder 47 (FIG. 2). Four circumferentially spaced arcuate slots 48 are formed through the end wall 45 and communicate with the space between the tube 42 and the outer sleeve 46. The outer surface of the tube 42 defines a cylindrical clutch surface 49 (FIGS. 2 and 3).

The outer race 50 is also a cylindrical tubular member having a main cylindrical wall 51 with a cylindrical inner surface 52 disposable in coaxial facing relationship with the outer surface 49 of the inner race 41 and spaced a predetermined distance therefrom. The outer race 50 has an enlarged-diameter rearward end 53 which cooperates with the main wall 51 to define therebetween a radially extending annular shoulder 54, the enlarged-diameter end 53 being internally threaded for threaded engagement with the outer sleeve 46 of the inner race 41.

The drive structure 20 also includes a generally cylindrical actuator member 55 which is generally Z-shaped in transverse cross section, having a main cylindrical wall portion 56 joined by a radially inwardly extending annular shoulder 57 to a rearwardly extending, reduced-diameter wall portion, which has a frustoconical outer surface 58 and an inner diameter very slightly greater than the outer diameter of the tube 42 of the inner race 41. An axially extending notch or tab recess 58*a*is formed in the inner surface of the main cylindrical wall portion 56 (see FIG. 2) for a purpose to be described below. A cylindrical bushing 59 retains the actuator member 55 in place in the rotatable race structure 40, in a manner described more fully below.

The drive structure 20 also includes a control mechanism 60 including a generally cylindrical control or trigger member 61, which has a generally cylindrical base portion 62 provided with a frustoconical inner surface 63 (see FIG. 4) shaped and dimensioned for wedging engagement with the frustoconical surface 58 of the actuator member 55. The trigger member 61 has four equiangularly spaced-apart axially extending slots 64 which extend from the rearward end thereof forwardly along most of the length thereof to the base portion 62, dividing the trigger member 61 into four elongated arms 65. Each of the arms 65 has externally threaded lands 66 and 67 thereon respectively disposed adjacent to the forward and rearward ends thereof. The trigger member 61 cooperates with the actuator member 55 to form a cone clutch mechanism 69 in a manner described below.

The control mechanism 60 also includes an adjustment mechanism 70 comprising front and rear travel stop assemblies 71 and 71A, which are respectively disposed in use at the threaded lands 66 and 67 of the trigger member 61. The travel stop assemblies 71 and 71A are substantially identical in construction, so that only one will be described in detail, and like parts of the two assemblies have the same reference numerals with the parts of the assembly 71A having the suffix "A". The travel stop assembly 71 includes an internally threaded adjustment ring 72 disposed for threaded engagement with the threaded lands 66. The ring 72 has a reduced-inner-diameter forward end which defines an annular, radially extending shoulder 73. Formed in this reduced-diameter inner surface just forwardly of the shoulder 73 is a circumferential groove 74. A stop ring 75 is seated against the shoulder 73 and is provided with four radially inwardly extending short fingers 76, respectively extending through the slots 64 of the trigger member 61. The stop ring 75 is retained in place by a retaining ring 77 which is seated in the groove 74 so as to permit the stop ring 75 to rotate relative to the adjustment ring 72. Diametrically opposed, internally threaded, radial bores 78 receive set screws 79 for locking the travel stop assembly 71 in position on the trigger member 61.

The driven structure 80 of the impulse mechanism 19 includes a cylindrical output shaft 81 having a cylindrical hub 82 with a reduced-diameter rearward end journalled in a bearing 83. The hub 82 has an axial bore formed in the rear end thereof which receives the reduced-diameter tip 21*a* of the drive shaft 21. A thrust washer 84 on the tip 21*a* is disposed between the rear end of the hub 82 and the flange 28 of the direction sleeve 25. A retaining ring 84*a*, seated in the groove 44 of the inner race 41, bears against the forward face of the bearing 83 for cooperation with the thrust washer 84 to retain the bearing 83 in place. The output shaft 81 has a cylindrical skirt 85 unitary with the hub 82 and extending radially outwardly therebeyond. A thrust washer 86 is seated in an annular recess at the front end of the skirt 85. Unitary with the skirt 85 and extending radially outwardly therefrom is an externally threaded annular flange 87 having an axial slot 87*a* formed therethrough and an angled annular relief 87*b* formed in the rear face thereof (see FIG. 2). A forward end 88 of the output shaft 81 is journalled in a suitable bearing in the housing 11 and terminates in a drive square 89, which projects forwardly from the tool housing 11, in a known manner.

The wrap spring clutch assembly 90 includes a helical wrap spring 91 provided at its forward and rearward ends, respectively, with short, axially extending tangs 92 and 93 (see FIG. 2). The wrap spring 91 is dimensioned so that its forward end fits over the skirt 85 of the output shaft 81 and seats against the flange 87, with the tang 92 received in the slot 87*a*. A split wedge 94 fits coaxially around the forward end of the wrap spring 91 and has a frustoconical wedge surface 94*a* thereon (see FIG. 4) and a tapered forward end 94*b* (FIG. 3). The wedge 94 is retained in place by a lock nut 95 which is threadedly engaged with the flange 87 of the skirt 85 and has an internal frustoconical wedge surface 96 which engages the wedge surface 94*a* on the wedge 94 in a wedging action which compresses the split ring wedge 94 radially inwardly to clamp the forward end of the wrap spring 91 on the output shaft 81. The forward end 94*b* of the wedge 94 fits into the angled relief 87*b* in the flange 87, which assists in moving the wedge 94 radially inwardly. It will be appreciated that the tool housing 11 will be provided with a suitable mounting plate 97 or other structure for supporting the bearing in which the forward end 88 of the output shaft 81 is journalled, as well as a mounting plate 98 or other suitable structure for supporting the motor assembly 17 (see FIG. 4).

In assembly of the impulse mechanism 19, the spring sleeve 30 is threaded onto the direction sleeve 25 until it abuts the flange 28. The arms 65 of the trigger member 61 are respectively fitted through the slots 48 of the inner race 41 from front to rear until the cylindrical base portion 62 of the trigger member 61 seats against the shoulder 47 of the inner race 41. Then the forward travel stop assembly 71 is threaded onto the trigger member 61, past the lands 67 and into engagement with the threaded lands 66 to the desired stop position, at which point it is locked in place by the set screws 79. In this regard, it will be appreciated that the adjustment ring 72 can rotate relative to the stop ring 75, which is held non-rotatable relative to the trigger member 61 by engagement of the fingers 76 with the arms 65. Next, the actuator member 55 is slid over the forward end of the inner race tube 42 until its shoulder 57 seats against a shoulder on the inner surface of the outer sleeve 46 of the inner race 41 (see FIG. 4). Then the bushing 59 is fitted over the forward end of the actuator member 55 and the outer race 50 is threadedly engaged with the outer sleeve 46 of the inner race 41. Thus, the bushing 59 will be retained in place between the shoulder 54 of the outer race 50 and the forward end of the outer sleeve 46 of the inner race 41 and will serve to stabilize and center the actuator member 55. Preferably, the parts are so dimensioned that the bushing 59 is rotatable relative to the outer race 50 and the actuator member 55. It will be appreciated that the actuator member 55 will be retained in place between the bushing 59 and the outer sleeve 46 of the inner race 41.

Next, the preassembled race structure 40 and control mechanism 60 are fitted over the spring sleeve 30 from front to back, with the splines 43 of the inner race 41 meshing with the splines 35 of the spring sleeve 30. The trigger member 61 is moved rearwardly until the stop ring 75 of the travel stop assembly 71 engages the front 0-ring 38 on the spring sleeve 30. Then the rear travel stop assembly 71A is threaded onto the threaded lands 67 of the trigger member 61 to the desired stop position and locked in place with the set screws 79A.

Then the front end of the compression spring 37 is seated in the pocket 36 of the spring sleeve 30 and the direction sleeve 25 is then threaded onto the drive shaft 21, with the rear end of the spring 37 seating against the flange 24 of the thrust washer/pilot ring 23 until the flange 28 of the direction sleeve 25 is substantially flush with the rear end of the reduceddiameter tip 21*a* of the drive shaft 21, as is illustrated in FIG. 3. In this position, the rear ends of the trigger member arms 65 will be fitted over the thrush washer/pilot ring 23, with the stop ring 75A spaced a slight distance forwardly of the flange 24. Then the thrust washer 84 is fitted over the reduced tip 21*a* of the drive shaft 21 until it abuts the flange 28 of the direction sleeve 25, and the bearing 83 is then fitted in the inner race 41 until it abuts the thrust washer 84. Then the retaining ring 84*a* is seated in the groove 44 of the inner race 41 for cooperation with the thrust washer 84 to retain the bearing 83 in place.

Next the wrap spring 91 is preassembled with the driven structure 80. First, the thrust washer 86 is seated on the skirt 85 of the output shaft 81, then the forward end of the wrap spring 91 is fitted over the skirt 85 with the tang 92 seated in the slot 87*a*. Then the split ring wedge 94 is fitted over the wrap spring 91 and its forward end 94*b* is compressed and seated in the angled relief 87*b*. Then the lock nut 95 is fitted over the rear end of the wrap spring 91 and the wedge 94 and threaded onto the skirt flange 87 to radially compress the wedge 94 so that the wedge surfaces 94*a* and 96 engage each other, which will fix the wrap spring 91 to the output shaft 81.

Finally, the driven structure 80 is assembled with the remainder the impulse mechanism 19, with the rear end of the wrap spring 91 fitted between the inner and outer races 41 and 50 so that the tang 93 engages in the recess 58*a* of the actuator member 55. During this movement, hub 82 fits over the reduced-diameter tip 21*a* of the drive shaft 21 and inside the bearing 83 until it abuts the thrust washer 84, at which point the thrust washer 86 will abut the forward end of the inner race tube 42. Then the front mounting plate 97 and its associated bearing are installed in place to support the front end 88 of the driven structure 80.

The parts, as thus assembled, will be in the normal rest condition illustrated in FIG. 3, with the drive structure 20 urged forwardly by the compression spring 37 against the driven structure 80, thereby holding the control member 61 forwardly so that the frustoconical surface 63 thereof is disposed in wedging engagement with the frustoconical surface 58 of the actuator member 55. Thus, the cone clutch mechanism 69 is disposed in an engaged condition clamping the actuator member 55 to the rotatable race structure 40, so that they cannot rotate relative to each other. This holds the wrap spring clutch assembly 90 in an engaged condition, so that when the motor assembly 17 is rotated the wrap spring 91 will be caused to wrap tightly, either inwardly against the outer surface 49 of the inner race 41, or outwardly against the inner surface 52 of the outer race 50, depending upon the direction of rotation. Thus, the wrap spring 91 will be locked to both the drive structure 20 and the driven structure 80 so that the former drives the latter.

In operation, it will be understood that the drive square 89 is adapted to receive a socket tool or the like which is, in turn, adapted for engagement with a load, such as a fastener to be driven. For example, if a nut is being driven onto a bolt or stud, when the trigger 15 of the impulse tool 10 is actuated the motor assembly 17 drives the drive structure 20 which, in turn, drives the driven structure 80 through the engaged wrap spring clutch assembly 90 to rotate the nut. During initial run-on of the fastener, it typically meets very little resistance and there is very low torque, so that the entire impulse mechanism 19 rotates as a unit with the output shaft 18 of the motor assembly 17. As the torque builds up with the increased resistance met by the driven fastener, at some point the driven structure 80 will begin to slow down, and the drive structure 20 will tend to slow down with it, since they are locked together by the engaged wrap spring clutch assembly 90. However, the drive shaft 21 is continuing to rotate at the substantially constant speed of the motor assembly 17. Thus, there develops a speed differential between the drive shaft 21 and the remainder of the impulse mechanism 19. Accordingly, because of the screw connection between the drive shaft 21 and the flywheel formed by the direction sleeve 25 and the spring sleeve 30, the flywheel begins to screw itself rearwardly relative to the drive shaft 21.

The manner in which this takes place depends upon the direction of rotation, because the direction sleeve 25 has a threaded connection of one hand or direction with the drive shaft 21 and a threaded connection of an opposite hand or direction with the spring sleeve 30. Thus, referring to FIG. 4, in one direction of rotation, the direction sleeve 25 cannot move rearwardly relative to the drive shaft 21, but the spring sleeve 30 can move rearwardly relative to the direction sleeve 25. In the opposite direction of rotation, illustrated in FIG. 6, the spring sleeve 30 cannot move rearwardly relative to the direction sleeve 25, but the direction sleeve 25 can move rearwardly relative to the drive shaft 21. In either case, it will be appreciated that the spring sleeve 30 moves rearwardly, either relative to the direction sleeve 25 or with it, compressing and storing energy in the spring 37.

This rearward movement of the spring sleeve 25 will continue until the rear one of the O-rings 38 engages the stop ring 75A of the rear travel stop assembly 71A, whereupon the rearwardly moving spring sleeve 30 will push the control mechanism 60 rearwardly a slight distance just sufficient to break the wedge between the frustoconical surfaces 63 and 58, disengaging the cone clutch mechanism 69 (see FIGS. 4 and 6). Once the cone clutch mechanism 69 is disengaged, the actuator member 55 is freed and releases the rear end of the wrap spring 91, allowing it to unwrap so that it can rotate freely relative to the rotatable race structure 40.

Once the wrap spring clutch assembly 90 is disengaged, the drive structure 20 is no longer tied to the driven structure 80. At this point, the compression spring 37 drives the flywheel (spring sleeve 30, either alone or in combination with the direction sleeve 25) axially forwardly, accelerating it both axially and rotationally because of the screw action, so that it may rotate considerably faster than the drive shaft 21. Thus, the potential energy stored in the spring 37 is converted to kinetic energy of the flywheel. Just before the flywheel reaches its original position of FIG. 3, the forward O-ring 38 on the spring sleeve 30 engages the stop ring 75 of the forward travel stop assembly 71, pushing the trigger member 61 forwardly and reengaging the cone clutch assembly 69. This, in turn, reengages the wrap spring clutch assembly 90 so that the kinetic energy of the flywheel is imparted in a sudden impulse to the driven structure 80 and the load. By reason of the operation of the wrap spring clutch assembly 90, this impulse is delivered relatively quietly, without a noisy and high-vibration impact of a hammer on an anvil, as in prior art impact tools. It will be appreciated that there is sufficient friction in the parts, such as between the trigger member arms 65 and the thrust washer/pilot ring 23, that the control member 61 will not return to its forward, clutch-engaging condition until it is driven to that position by the flywheel engaging the stop ring 75.

Once the impulse is delivered to the load, the load will act like a torsion spring and will cause the flywheel to rebound, and this rebound force, together with the speed differential of the parts, will again cause the flywheel to retract, and this operation will continue to deliver repeated torque impulses to the load.

It will be appreciated that, by adjustment of the position of the travel stop assembly 71, the initial compression of the spring 37 in the normal rest condition of the assembly can be adjusted, thereby to adjust the threshold torque at which the flywheel will begin to retract. Similarly, by adjustment of the rear travel stop assembly 71A, the rear stroke limit of the flywheel can be adjusted to adjust the maximum energy which can be stored in the spring 37. The frequency of the impulses delivered to load will be determined by the overall stroke of the flywheel which is, in turn, determined by the separation between the front and rear travel stop assemblies 71 and 71A.

The adjustment mechanism 70 is illustrated in a simplified form to demonstrate the principle of operation. However, it will be appreciated that in the form illustrated in FIGS. 3 and 4, it would be necessary to open the tool housing 11 to effect an adjustment of the adjustment mechanism 70. For purposes of such adjustment, the set screws 79, 79A are released and the adjustment ring 72 or 72A is manually held against rotation, while the drive structure 20 is rotated by the motor assembly 17, thereby causing the adjustment ring 72 or 72A to be screwed axially to a new position.

In practice, the adjustment mechanism 70 would preferably be designed and calibrated to operate in a preferred range or at a specific torque. However, there is an arrangement which would permit adjustment from outside the tool housing 11. Such an arrangement is illustrated in FIG. 7 and is generally designated by the numeral 100. The mechanism 100 utilizes a modified travel stop assembly 101 having an adjustment ring 102, and which is substantially the same as the travel stop assemblies 71 and 71A, described above, except that instead of the set screw holes 78, the adjustment ring 102 is provided with a socket 108 in its outer surface. The barrel portion 12 of the tool housing 11 has a longitudinal slot 103 formed therein and is also provided with an inner wall or flange structure 103*a*, which cooperates with the outer housing wall to define therebetween a narrow channel 104, which slidably receives a slider flange of a slider member 105 which projects radially outwardly through the slot 103. The slider 105 has a bore 106 extending radially therethrough and receives therein a release pin 107, which is axially movable between an inwardly extending engaged position extending into the socket in the adjustment ring, illustrated in phantom in FIG. 7, and a normal retracted position withdrawn from the socket and illustrated in solid line in FIG. 7. The pin 107 is resiliently biased to the retracted position by a helical compression spring 109 seated in the bore 106 and bearing against a stop bushing 109*a* threadedly engaged in the outer end of the bore 106.

In operation, when it is desired to adjust the position of the travel stop assembly 101, the release pin 107 is manually depressed to its engaged condition, thereby holding the adjustment ring 102 against rotation, while the motor assembly 17 is operated to rotate the drive structure 20, thereby causing the adjustment ring 102 to be screwed axially to a new position. This axial movement is accommodated by the slider 105 in the channel 104. The travel stop assembly 101 would preferably be the only adjustable stop, and would be used with a front travel stop assembly 71 which would be permanently locked in place after calibration of the engagement distance for the cone clutch mechanism 69.

From the foregoing, it can be seen that there has been provided an improved impulse mechanism for a power tool which delivers torque impulses in a low-noise, low-vibration manner, while at the same time affording ease of adjustment of the limiting torque and impulse repetition rate.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A rotary impulse tool for delivering torque impulses to a load comprising:

a drive shaft having an axis and adapted to be coupled to a motive source, an output shaft adapted to be coupled to said load, an energy storage mechanism coupled to said drive shaft and movable relative thereto between first and second conditions, a clutch assembly coupled between said energy storage mechanism and said output shaft for transmitting torque therebetween, said energy storage mechanism being responsive to a relative rotation between said drive shaft and said output shaft through more than 180 ° for moving from said first condition to said second condition to store potential energy, said energy storage mechanism in its second condition being operable for rapidly moving to its first condition to convert said stored potential energy to kinetic energy, and control mechanism responsive to movement of said energy storage mechanism to its first condition to engage said clutch assembly for delivering said kinetic energy of said energy storage mechanism in a torque impulse to said output shaft.

2. The tool of claim 1, wherein said energy storage mechanism includes a flywheel threadedly engaged with said drive shaft for axial and rotational movement relative thereto between said first and second conditions, said energy storage mechanism further including a helical compression spring resiliently urging said flywheel to said first condition.

3. The tool of claim 1, wherein said clutch assembly includes an input member-coupled to said energy storage mechanism, and a helical wrap spring coupled between said input member and said output Shaft and operable for connecting said input member to said output shaft by means of frictional surface contact.

4. The tool of claim 3, wherein said input member has a cylindrical surface, said wrap spring being arranged coaxially with said cylindrical surface and having an end fixed to said output shaft, said wrap spring in an engaged condition firmly frictionally engaging said cylindrical surface and clearing said cylindrical surface in a disengaged condition.

5. The tool of claim 3, wherein said input member includes coaxial cylindrical surfaces receiving said wrap spring in clearance fit coaxially therebetween in a disengaged condition of said clutch assembly, said wrap spring having an end thereof fixed to said output shaft, said wrap spring in an engaged condition of said clutch mechanism firmly frictionally engaging one of said cylindrical surfaces when said drive shaft is rotating in one direction and firmly frictionally engaging said other of said cylindrical surfaces when said drive shaft is rotating in said opposite direction.

6. The tool of claim 3, wherein said input member is splined to said energy storage mechanism.

7. The tool of claim 1, wherein said control mechanism includes a control member having stop portions respectively engageable by said energy storage mechanism as it moves to its first and second conditions.

8. The impulse tool of claim 1, wherein said energy storage mechanism is axially and rotatably movable relative to said drive shaft.

9. The impulse tool of claim 1, wherein said control mechanism includes structure responsive to movement of said energy storage mechanism to its second condition for disengaging said clutch assembly.

10. A rotary impulse tool for delivering torque impulses to a load comprising:

a drive shaft having an axis and adapted to be coupled to a motive source, an output shaft adapted to be coupled to said load, an energy storage mechanism coupled to said drive shaft and movable relative thereto between first and second conditions, a clutch assembly coupled between said energy storage mechanism and said output shaft and having an engaged condition for transmitting torque and a disengaged condition, said energy storage mechanism being responsive to a relative rotation between said drive shaft and said output shaft through more than 180 ° for moving from said first condition to said second condition to store potential energy, and control mechanism, coupled to said clutch assembly and responsive to movement of said energy storage mechanism to its second condition for shifting said clutch assembly to its disengaged condition, the energy storage mechanism in its second condition being responsive to shifting of said clutch assembly to its disengaged condition for rapidly rotatably and axially moving to its first condition to convert said stored potential energy to kinetic energy, said control mechanism being responsive to movement of said energy storage mechanism to its first condition to shift said clutch assembly to its engaged condition for delivering said kinetic energy of said energy storage mechanism in a torque impulse to said output shaft.

11. The tool of claim 10, wherein said energy storage mechanism is axially and rotatably movable relative to said drive shaft.

12. The tool of claim 10, wherein said control mechanism includes an adjustment mechanism movable for determining the position of said energy storage mechanism in its second condition and thereby determining the amount of energy stored therein, and actuator mechanism for selectively controlling movement of said adjustment mechanism.

13. The tool of claim 12, wherein said control mechanism includes an elongated cylindrical trigger member, said adjustment mechanism including a travel ring encircling said trigger member and threadedly engaged therewich, and a stop member carried by said travel ring for engagement by said energy storage mechanism in its second condition, said actuator mechanism including means for preventing rotational movement of said travel ring white accommodating axial movement thereof.

14. The tool of claim 13, wherein said stop member includes a ring rotatable relative to said travel ring and having finger portions extending radially inwardly through axial slots in said trigger member to accommodate axial movement of said stop member relative to said trigger member.

15. The tool of claim 14, wherein said actuator mechanism includes an axially movable outer portion which is manually engageable with said travel ring for preventing rotation thereof.

16. The tool of claim 12, wherein said control mechanism includes a stop portion engageable by said energy storage mechanism as it moves to its first condition.

17. A rotary impulse tool for delivering torque impulses to a load comprising:

a drive shaft having an axis and adapted to be coupled to a motive source, an output shaft adapted to be coupled to said load, a clutch assembly including a rotatable structure having coaxial cylindrical surfaces, said clutch assembly further including a helical wrap spring disposed in clearance fit coaxially between said cylindrical surfaces and having a first end fixed to said output shaft and a second end, a cylindrical flywheel sleeve threadedly coupled to said drive shaft and splined to said rotatable structure and rotatably and axially movable relative to said drive shaft and said rotatable structure between first and second conditions, bias means resiliently urging said flywheel sleeve to said first condition, said rotatable structure having a first frustoconical surface thereon fixed to said second end of said wrap spring, and a control clutch member having a second frustoconical surface thereon and axially movable between engaged and disengaged positions relative to said first frustoconical surface for respectively placing said clutch assembly in an engaged condition for transmitting torque and a disengaged condition, said flywheel sleeve being responsive to a rotational speed differential between said drive shaft and said output shaft when said clutch assembly is in its engaged condition for moving from said first condition to said second condition to store potential energy, said control clutch member including a first portion engageable by said flywheel sleeve as it moves to its second condition for shifting said control clutch member to its disengaged position thereby to disengage said clutch assembly, said flywheel sleeve in its second condition being responsive to shifting of said clutch assembly to its disengaged condition for rapidly rotatably and axially moving to its first condition to convert said stored potential energy to kinetic energy, said control clutch member including a second portion engageable by said flywheel sleeve as it moves to its first condition to shift said control clutch member to its engaged position, thereby engaging said clutch assembly for delivering said kinetic energy of said flywheel sleeve in a torque impulse to said output shaft.

18. The tool of claim 17, and further comprising adjustment mechanism for selectively adjusting the axial positions of said first and second portions of said control clutch member, thereby to vary said axial distance between said first and second conditions of said flywheel sleeve.

* * * * *

UNITED STATES PATENT AND TRADEMARK OFFICE

CERTIFICATE OF CORRECTION

PATENT NO. : 5,941,360

DATED : August 24, 1999

INVENTOR(S) : Gordon A. Putney and Dean J. Iwinski

It is certified that error appears in the above-identified patent and that said Letters Patent is hereby corrected as shown below:

column 10, claim 3, line 45, after "member" delete " - ";
column 10, claim 3, line 47, "Shaft" should be "shaft"; and
column 11, claim 10, line 28, after "mechanism" delete " , ".

Signed and Sealed this

Thirteenth Day of June, 2000

Attest:

Q. TODD DICKINSON

*Attesting Officer* *Director of Patents and Trademarks*